United States Patent
Baek et al.

(10) Patent No.: US 10,014,926 B1
(45) Date of Patent: Jul. 3, 2018

(54) SYMBOL QUALITY ESTIMATION FOR ADAPTIVE BEAM-FORMING

(71) Applicant: Northrop Grumman Systems Corporation, Falls Church, VA (US)

(72) Inventors: Andrew S. Baek, Irvine, CA (US); Thompson Truong, Fullerton, CA (US); Othon Equihua, Downey, CA (US); Kevin Kanemori, Torrance, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 0 days.

(21) Appl. No.: 15/793,436

(22) Filed: Oct. 25, 2017

(51) Int. Cl.
  *H04B 7/10* (2017.01)
  *H04B 7/08* (2006.01)
  *H04B 7/06* (2006.01)
  *H04L 25/02* (2006.01)

(52) U.S. Cl.
  CPC ......... *H04B 7/0848* (2013.01); *H04B 7/0617* (2013.01); *H04B 7/086* (2013.01); *H04L 25/0224* (2013.01)

(58) Field of Classification Search
  CPC .... H04B 7/0848; H04B 7/0617; H04B 7/086; H04L 25/0224
  USPC ....................................................... 375/347
  See application file for complete search history.

(56) References Cited

U.S. PATENT DOCUMENTS

| | | | |
|---|---|---|---|
| 7,295,596 B2 | 11/2007 | Misra et al. | |
| 7,933,353 B2 | 4/2011 | Maltsev et al. | |
| 8,555,031 B2 | 10/2013 | Fitton | |
| 8,812,576 B1 | 8/2014 | Mauer | |
| 9,392,474 B2 * | 7/2016 | Devarasetty | H04W 24/06 |
| 9,883,458 B2 * | 1/2018 | Clevorn | H04W 52/028 |
| 2011/0045790 A1 * | 2/2011 | Lindoff | H04B 17/336 455/226.3 |
| 2014/0219327 A1 * | 8/2014 | Kumar | H04L 25/03 375/232 |

FOREIGN PATENT DOCUMENTS

WO  2011038940  4/2011

OTHER PUBLICATIONS

Ma, L. et al; QR decomposition-based matrix inversion for high performance embedded MIMO receivers; Signal Processing, IEEE Transactions on, vol. 59, No. 4 (2011); Apr. 2011; pp. 1858-1867.

(Continued)

*Primary Examiner* — Helene Tayong
(74) *Attorney, Agent, or Firm* — Patti & Malvone Law Group, LLC

(57) ABSTRACT

A method for performing efficient hardware implementation of adaptive beam-forming includes: computing a threshold for a symbol describing a beam; estimate a power for the symbol; using the threshold, select a symbol having a power below the threshold; using the selected symbols, calculating an average power of the selected symbols having the second through nth highest powers; using the average power, estimating a symbol quality; transmitting a reference symbol; receiving the reference symbol; using the received reference symbol, estimating an alpha quality; and using one or more of the symbol quality estimate and the alpha quality estimate, computing a weight for one or more of the symbols.

20 Claims, 2 Drawing Sheets

(56) References Cited

OTHER PUBLICATIONS

Lee, M. W. et al; High-speed tournament givens rotation-based QR Decomposition Architecture for MIMO Receiver; 2012 IEEE International Symposium on Circuits and Systems, Seoul, 2012, pp. 21-24.

Zhu, Y. et al; A configurable distributed systolic array for QR decomposition in MIMO-OFDM systems; ASIC (ASICON), 2013 IEEE 10th International Conference on, Shenzhen, 2013, pp. 1-5; 978-1-4673-6417-1; 2013 IEEE.

Yoon, J. H. et al; A low-complexity composite QR decomposition architecture for MIMO detector; 2014 IEEE International Symposium on Circuits and Systems (ISCAS), Melbourne VIC, 2014, pp. 1692-1695; 978-1-4799-3432-4; 2014 IEEE.

Medina, C. et al; An inverse QRD-RLS algorithm for linearly constrained minimum variance adaptive filtering; Signal Processing 93, No. 5 (2013); pp. 1308-1316; 0165-1684; 2012 Elsevier B.V.

* cited by examiner

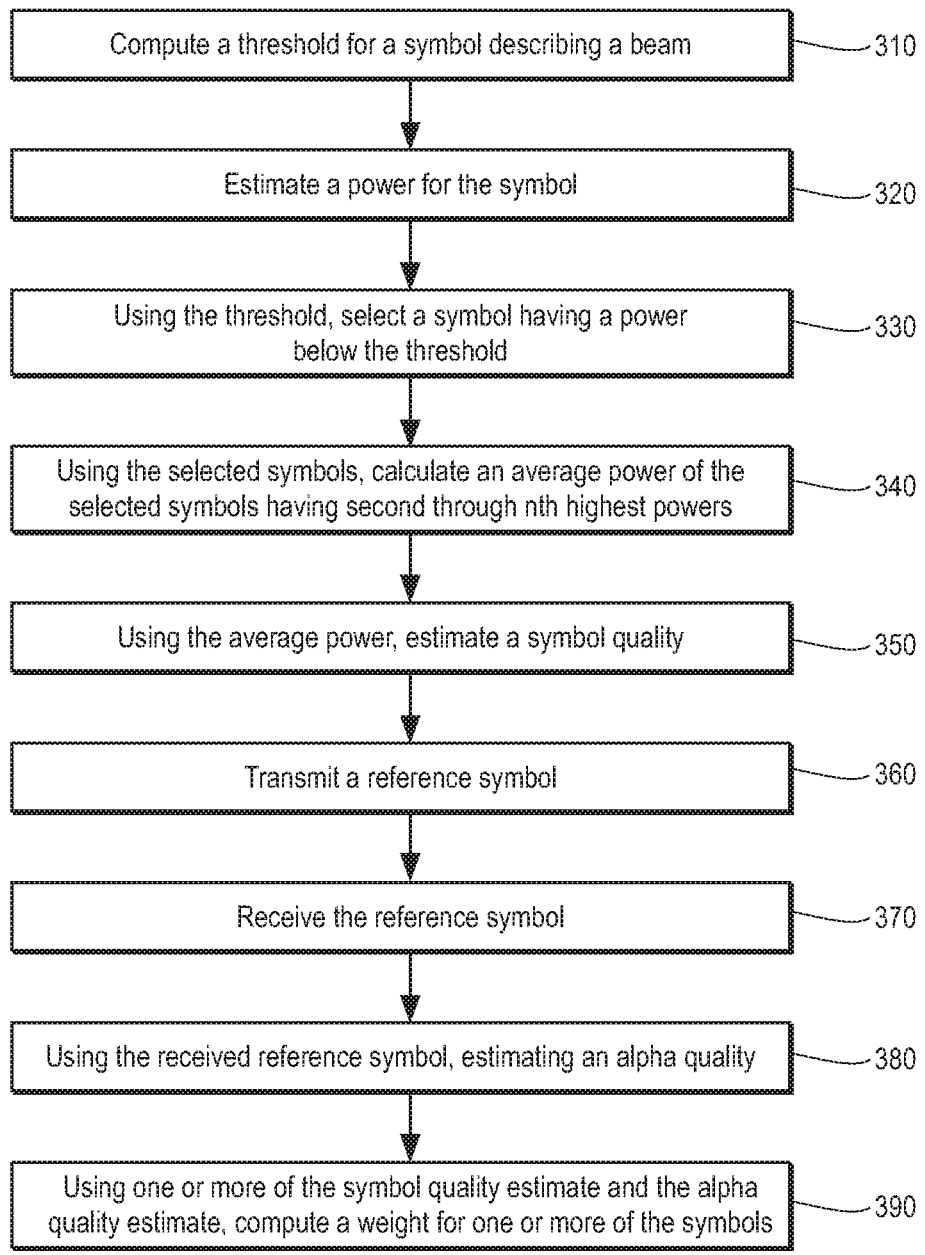

SYMBOL QUALITY ESTIMATION FOR ADAPTIVE BEAM-FORMING

STATEMENT OF GOVERNMENT RIGHTS

The Government of the United States of America has rights in this invention pursuant to Government Contract No. F04701-02-C-0002 awarded by the United States Air Force.

SUMMARY

A method for performing efficient hardware implementation of adaptive beam-forming includes: computing a threshold for a symbol describing a beam; estimating a power for a symbol; using the threshold, selecting a symbol having a power below the threshold; using the selected symbols, calculating an average power of the selected symbols having second through nth highest powers; using the average power, estimating a symbol quality; transmitting a reference symbol; receiving the reference symbol; using the received reference symbol, estimating an alpha quality; and using one or more of the symbol quality estimate and the alpha quality estimate, computing a weight for one or more of the symbols.

An apparatus for performing efficient hardware implementation of adaptive beam-forming, includes: a symbol quality estimator configured to estimate a quality of a symbol, the symbol quality estimator including: a threshold estimator configured to estimate a threshold of a symbol; a power adjuster configured to adjust symbol power, the power adjuster operably connected to the threshold estimator; a symbol power estimator configured to estimate power of the symbol, the symbol power estimator operably connected to the power adjuster, the symbol power estimator operably connected to the threshold estimator; and a symbol selector that selects a symbol having power below the threshold, the symbol selector operably connected to the threshold estimator; an alpha quality estimator configured to transmit a reference symbol, the alpha quality estimator further configured to receive the reference symbol, the alpha quality estimator further configured, using the transmitted reference symbol and the received reference symbol, to estimate a quality estimation parameter alpha (a); and a symbol weight computer, the symbol weight computer operably connected to the symbol quality estimator, the symbol weight computer also operably connected to the alpha quality estimator, the symbol weight computer configured to compute a symbol weight using one or more of the symbol quality estimate and the alpha quality estimate.

DESCRIPTION OF THE DRAWINGS

The accompanying drawings provide visual representations which will be used to more fully describe various representative embodiments and can be used by those skilled in the art to better understand the representative embodiments disclosed herein and their inherent advantages. In these drawings, like reference numerals identify corresponding elements.

FIG. 3 is a flowchart of a method for efficient hardware implementation of adaptive beam-forming.

DETAILED DESCRIPTION

Figure 1:
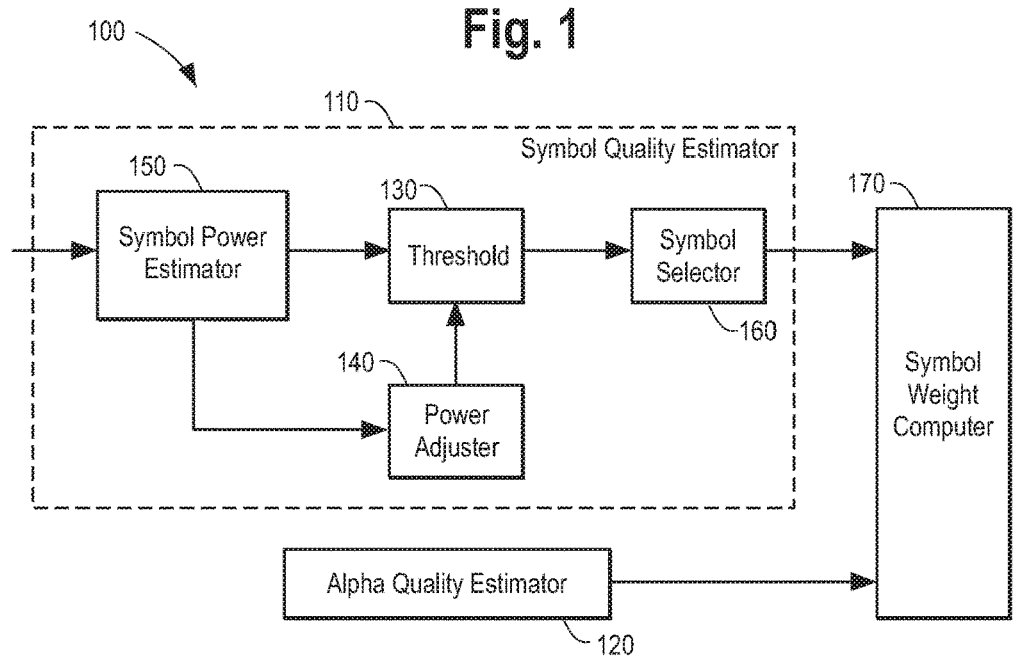
FIG. 1 is a block diagram of an apparatus for efficient hardware implementation of adaptive beam-forming.

While the present invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described.

Multiple antenna beam-forming requires real-time computation of optimal beam weights to maximize received signal performance, especially in a variety of interference challenging environments. The beam weight computation needs to be performed in a highly efficient and accurate manner in real-time with high dynamic range to effectively operate in interference hostile environments. Embodiments of the invention provide a method and apparatus for efficient hardware implementation of adaptive beam-forming. More specifically, embodiments of the invention provide a method and apparatus for hardware architecture and implementation of multiple antenna beam-forming configured to meet performance requirements with highly efficient hardware implementation.

A matrix inversion becomes highly complex for hardware implementation as a number of beams increases. A direct inversion computation is practical only up to three beams. For higher numbers of antennas, however, direct inversion involves mathematical formation that is not amenable for hardware implementation. QR decomposition becomes far more efficient as it processes beam signals with a systolic topology that allows extensive time-sharing of core processing elements. In addition, according to embodiments of the invention, the hardware design includes mechanisms to address high dynamic range situations imposed by high power interferers. The techniques include a dynamic scaling and variable beam combining.

For example, the power can be approximated using the following equation:

$$|\tilde{S}| \Rightarrow \text{Max}(I, Q) + \frac{1}{2}\text{Min}(I, Q),$$

where $|\tilde{S}|$ is the estimated power, I is an in-phase channel, and Q is a quadrature channel.

For example, the threshold can be updated over time. For example, the threshold is controllable by a user. For example, the threshold can be computed on the ground. For example, the threshold can be computed offline on the ground. For example, the threshold can be updated from the ground over time. For example, the threshold can comprise a default value. For example, the threshold can be the same for each beam. For example, the threshold can be different for different beams. For example, the threshold can be calibrated according to a region where a beam originates. For example, the threshold can be computed in real time by a processor. For example, the threshold can be computed in real time by a processor separate from a satellite that generates the beams.

FIG. 1 is a block diagram of an apparatus 100 for efficient hardware implementation of adaptive beam-forming.

The apparatus 100 comprises a symbol quality estimator 110 configured to estimate a quality of a symbol. For example, the symbol quality estimator 110 is configured to estimate the quality of the symbol using one or more of regular quadrature phase shift keying (QPSK), phase-shift keying (PSK), amplitude and phase-shift keying (APSK), binary phase-shift keying (BPSK), differential phase-shift keying (DPSK), symmetrical differential phase-shift keying (SDPSK), and quadrature amplitude modulation (QAM) signaling formats.

The apparatus 100 further comprises an alpha quality estimator 120 configured to estimate a quality estimation parameter alpha ($\alpha$). The alpha quality estimator 120 is operably connected to the symbol quality estimator 110. The alpha quality estimator 120 is configured to transmit a reference symbol. The alpha quality estimator 120 is further configured to receive the reference symbol. The alpha quality estimator 120 is further configured, using the transmitted reference symbol and the received reference symbol, to estimate the quality estimation parameter alpha.

The symbol quality estimator 110 further comprises a threshold estimator 130 configured to estimate a threshold of the symbol. The symbol quality estimator 110 further comprises a power adjuster 140 configured to adjust symbol power, the power adjuster 140 being operably connected to the threshold estimator 130.

The symbol quality estimator 110 further comprises a symbol power estimator 150 configured to estimate power of the symbol, the symbol power estimator 150 being operably connected to the power adjuster 140, the symbol power estimator 150 also operably connected to the threshold estimator 130. The symbol quality estimator 110 further comprises a symbol selector 160 that selects a symbol, the symbol selector 160 being operably connected to the threshold estimator 130. The symbol selector 160 comprises a comparator that compares symbol power with the threshold estimate. For example, the symbol selector 160 selects a symbol having a power below the threshold.

The symbol quality estimator 110 is operably connected to a symbol weight computer 170. For example, the symbol quality estimator 110 is operably connected to the symbol weight computer 170 via the symbol selector 160. The symbol weight computer 170 is operably connected to the alpha quality estimator 120. The symbol weight computer 170 is configured to compute a symbol weight using one or more of the symbol quality estimate and the alpha quality estimate.

Figure 2:
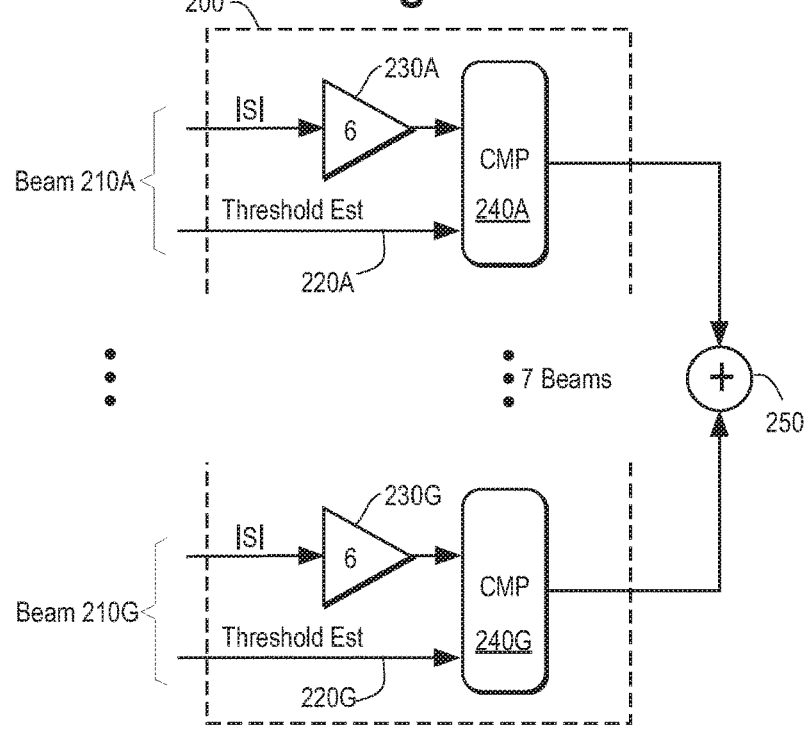
FIG. 2 is a schematic diagram of a symbol quality estimator used by an apparatus for efficient hardware implementation of adaptive beam-forming.

FIG. 2 is a schematic diagram of a symbol quality estimator 200 used by an apparatus for efficient hardware implementation of adaptive beam-forming. Beams 210A-210G are each incident on the symbol quality estimator 200.

The symbol quality estimator 200 comprises threshold estimators 220A-220G. The symbol quality estimator 220 also comprises symbol power estimators 230A-230G. The symbol power estimators 230A-230G are configured to approximate symbol power using symbol magnitude.

For example, as illustrated, in the case of six beams, the power adjuster 140 performs a "shift and add" function for a constant multiplier which in this example is 6, multiplying symbol quality by 6 so as to save on computation costs relative to a division by 6 on the threshold estimation side. For example, an integrator is maintained on the summation of the value of six symbols having the highest powers. For example, an integrator is maintained on the summation of the value of six symbols having the highest magnitudes. For example, a "sliding window method" is used to remove a symbol having a minimum magnitude value of the remaining symbols in a rolling process. In this rolling "sliding window" process, the removed symbol is replaced with a symbol having a next higher magnitude value. For example the beam-forming is performed using a "2+40" mode comprising two header symbols and 40 payload symbols. For example, the threshold is the same for the symbols having second through nth highest magnitudes. For example, n equals 7.

The symbol quality estimator 200 further comprises comparators 240A-240G. For at least one beam, and preferably for each beam, the comparators 240A-240G compare the computed symbol power as computed by the symbol power estimators 230A-230G with the threshold estimated by the threshold estimators 220A-220G.

The symbol quality estimator 200 further comprises a summer 250. For symbols having a magnitude below the corresponding threshold, the comparator 240A-240G transmits the value to the summer 250. The summer 250 sums the six highest magnitude symbols. Once the process completes on a given hop, the summer 250 transmits the result as output of the symbol quality estimator 200.

FIG. 3 is a flowchart of a method 300 for efficient hardware implementation of adaptive beam-forming. The order of the steps in the method 300 is not constrained to that shown in FIG. 3 or described in the following discussion. Several of the steps could occur in a different order without affecting the final result.

In step 310, a threshold is computed for a symbol describing a beam. Block 310 then transfers control to block 320.

In step 320, a power is estimated for the symbol. For example, estimating comprises approximating power as a magnitude. Block 320 then transfers control to block 330.

In step 330, using the threshold, a symbol is selected having a power below the threshold. Block 330 then transfers control to block 340.

In step 340, using the selected symbols, an average power of the selected symbols having second through nth highest powers is calculated. Block 340 then transfers control to block 350.

In step 350, using the average power, a symbol quality is estimated. Block 350 then transfers control to block 360.

In step 360, a reference symbol is transmitted. Block 360 then transfers control to block 370.

In step 370, the reference symbol is received. Block 370 then transfers control to block 380.

In step 380, using the received reference symbol, an alpha quality is estimated. Block 380 then transfers control to block 390.

In step 390, using one or more of the symbol quality and the alpha quality estimate, a weight is computed for one or more of the symbols. Block 390 then terminates the process.

For example, the computing step comprises computing the threshold using the following equation:

$$I_j(\delta_{s(1)}) = \begin{cases} i, |\tilde{S}| < \tilde{\delta}_{s,th} \\ 0, |\tilde{S}| \geq \tilde{\delta}_{s,th} \end{cases}, \text{ for } l = 1, \ldots 42; \begin{bmatrix} I_{1,1} & \cdots & I_{1,42} \\ \vdots & \ddots & \vdots \\ I_{7,1} & \cdots & I_{7,42} \end{bmatrix},$$

where $I_j$ is the threshold for an I-th symbol, $|\tilde{S}|$ is estimated symbol magnitude, $\delta_{s,th}$ is estimated beam magnitude after computing using the symbols s and for the threshold th, wherein the beam-forming is performed using a "2+40" mode comprising two header symbols and 40 payload symbols.

For example, the calculating step comprises approximating power using the following equation:

$$\delta_{s,th}^2 = \frac{1}{6}\sum_{i=36}^{41}(|S^2|) \Rightarrow \tilde{\delta}_{s,th}^2 = \frac{1}{6}\sum_{i=36}^{41}\max_i(|\tilde{S}|),$$

wherein n equals seven, wherein the beam-forming is performed using a "2+40" mode comprising two header symbols and 40 payload symbols, wherein $\delta^2_{s,th}$ is beam power after computing using the symbols s and for the threshold th, $S^2$ is symbol power, $\delta_{s,th}$ is estimated beam magnitude after computing using the symbols s and for the threshold th, and $|\tilde{S}|$ is estimated symbol magnitude.

Embodiments of the invention may be applied to a wide variety of contexts including, for example, regular quadrature phase shift keying (QPSK), phase-shift keying (PSK), amplitude and phase-shift keying (APSK), binary phase-shift keying (BPSK), differential phase-shift keying (DPSK), symmetrical differential phase-shift keying (SDPSK), and quadrature amplitude modulation (QAM) signaling formats.

Advantages of the invention include highly efficient real-time computation of beam weights with a wide dynamic range. The high performance real-time computation has a significant impact on the mitigation of time-varying interferences. Excluding the highest value from the power computation can help reduce or remove extreme bias in the threshold computation in a jamming scenario, improving performance. Estimating magnitude rather than power saves significantly on computation costs. Estimated magnitude reduces sizing cost by at least 2 multiplication operations per beam.

While the above representative embodiments have been described with certain components in exemplary configurations, it will be understood by one of ordinary skill in the art that other representative embodiments can be implemented using different configurations and/or different components. For example, it will be understood by one of ordinary skill in the art that instead of using the second through nth highest beam magnitudes to determine the average power, the third through nth highest beam magnitudes could for example be used, or as another example, the first through sixth highest beam magnitudes.

The representative embodiments and disclosed subject matter, which have been described in detail herein, have been presented by way of example and illustration and not by way of limitation. It will be understood by those skilled in the art that various changes may be made in the form and details of the described embodiments resulting in equivalent embodiments that remain within the scope of the invention. It is intended, therefore, that the subject matter in the above description shall be interpreted as illustrative and shall not be interpreted in a limiting sense.

What is claimed is:

1. A method for performing efficient hardware implementation of adaptive beam-forming, comprising:
    computing a threshold for a symbol describing a beam;
    estimating a power for the symbol;
    using the threshold, selecting the symbol having a power below the threshold;
    using the selected symbols, calculating an average power of the selected symbols having second through nth highest powers;
    using the average power, estimating a symbol quality;
    transmitting a reference symbol;
    receiving the reference symbol;
    using the received reference symbol, estimating an alpha quality; and
    using one or more of the symbol quality estimate and the alpha quality estimate, computing a weight for one or more of the symbols.

2. The method of claim 1, where n equals seven.

3. The method of claim 1, wherein computing comprises computing a threshold for each symbol.

4. The method of claim 3, wherein the threshold is the same for the selected symbols having second through nth highest magnitudes.

5. The method of claim 1, wherein estimating comprises approximating the power of the beam as a magnitude of the beam.

6. The method of claim 5, wherein estimating comprises approximating power using the following equation:

$$|\tilde{S}| \Rightarrow \text{Max}(I, Q) + \frac{1}{2}\text{Min}(I, Q),$$

where $|\tilde{S}|$ is the estimated power, I is an in-phase channel, and Q is a quadrature channel.

7. The method of claim 1, wherein the computing step comprises updating the threshold over time.

8. The method of claim 1, wherein the computing step comprises receiving controls from a user regarding the threshold.

9. The method of claim 1, wherein the computing step comprises computing the threshold on ground.

10. The method of claim 1, wherein the computing step comprises computing the threshold offline.

11. The method of claim 1, wherein the computing step comprises computing the threshold in real time.

12. The method of claim 1, wherein the computing step comprises computing the threshold in real time using a processor separate from a satellite that generates the beams.

13. The method of claim 1, wherein the threshold is the same for each beam.

14. The method of claim 1, wherein the computing step comprises calibrating the threshold according to a region where the beam originates.

15. The method of claim 1, wherein the calculating step comprises, using a sliding window method, removing a minimum remaining value in the sliding window.

16. The method of claim 15, wherein the calculating step further comprises replacing the removed minimum remaining value in the sliding window with a next maximum value.

17. The method of claim 16, wherein the calculating step further comprises using a shift and add for a constant multiplier.

18. The method of claim 1, wherein the symbol is computed using one or more of regular quadrature phase shift keying (QPSK), phase-shift keying (PSK), amplitude and phase-shift keying (APSK), binary phase-shift keying (BPSK), differential phase-shift keying (DPSK), symmetrical differential phase-shift keying (SDPSK), and quadrature amplitude modulation (QAM) signaling formats.

19. An apparatus for performing efficient hardware implementation of adaptive beam-forming, comprising:
    a symbol quality estimator configured to estimate a quality of a symbol, the symbol quality estimator comprising:
        a threshold estimator configured to estimate a threshold of the symbol;

a power adjuster configured to adjust symbol power, the power adjuster operably connected to the threshold estimator;

a symbol power estimator configured to estimate power of the symbol, the symbol power estimator operably connected to the power adjuster, the symbol power estimator operably connected to the threshold estimator; and a symbol selector that selects the symbol, the symbol selector operably connected to the threshold estimator;

an alpha quality estimator configured to transmit a reference symbol, the alpha quality estimator further configured to receive the reference symbol, the alpha quality estimator further configured, using the transmitted reference symbol and the received reference symbol, to estimate a quality estimation parameter alpha ($\alpha$); and a symbol weight computer operably connected to the symbol quality estimator, the symbol weight computer also operably connected to the alpha quality estimator, the symbol weight computer configured to compute a symbol weight using one or more of the symbol quality estimate and the alpha quality estimate.

20. The apparatus of claim 19, wherein the symbol weight computer is operably connected to the symbol quality estimator via the symbol selector.

* * * * *